United States Patent
Chen et al.

(10) Patent No.: US 8,007,750 B2
(45) Date of Patent: Aug. 30, 2011

(54) MULTILAYERED CATALYST COMPOSITIONS

(75) Inventors: Shau-Lin Franklin Chen, Piscataway, NJ (US); Jin Sakakibara, Edison, NJ (US); Tian Luo, Piscataway, NJ (US); Harold Rabinowitz, Montclair, NJ (US)

(73) Assignee: BASF Corporation, Florham Park, NJ (US)

(*) Notice: Subject to any disclaimer, the term of this patent is extended or adjusted under 35 U.S.C. 154(b) by 759 days.

(21) Appl. No.: 11/780,094

(22) Filed: Jul. 19, 2007

(65) Prior Publication Data
US 2009/0022641 A1    Jan. 22, 2009

(51) Int. Cl.
*B01D 53/56* (2006.01)
*B01D 53/86* (2006.01)
*B01J 8/00* (2006.01)
*B01J 23/00* (2006.01)
*B01J 21/00* (2006.01)
*B01J 20/00* (2006.01)
*C01B 21/00* (2006.01)

(52) U.S. Cl. .......... 423/239.1; 502/261; 502/262; 502/263; 502/302; 502/303; 502/304; 502/326; 502/327; 502/332; 502/333; 502/334; 502/339; 502/349; 502/355; 502/415; 502/439; 502/527.12; 502/527.13

(58) Field of Classification Search .......... 502/302–304, 502/326, 332–334, 339, 355, 415, 439, 527.13, 502/261–263, 327, 349, 527.12; 423/239.1
See application file for complete search history.

(56) References Cited

U.S. PATENT DOCUMENTS

| | | | | | |
|---|---|---|---|---|---|
| 4,128,506 | A | * | 12/1978 | Hegedus et al. | 502/334 |
| 4,152,301 | A | * | 5/1979 | Summers et al. | 502/333 |
| 4,287,856 | A | * | 9/1981 | Enga | 122/4 D |
| 5,254,519 | A | | 10/1993 | Wan et al. | |
| 5,332,554 | A | * | 7/1994 | Yasaki et al. | 422/180 |
| 5,407,880 | A | * | 4/1995 | Ikeda et al. | 502/67 |
| 5,525,307 | A | * | 6/1996 | Yasaki et al. | 422/171 |
| 5,593,647 | A | * | 1/1997 | Kirby | 422/180 |
| 5,597,771 | A | * | 1/1997 | Hu et al. | 502/304 |
| 5,814,576 | A | * | 9/1998 | Yamamoto | 502/303 |
| 5,898,014 | A | | 4/1999 | Wu et al. | |

(Continued)

FOREIGN PATENT DOCUMENTS

EP    0566401 A1    10/1993

(Continued)

OTHER PUBLICATIONS

PCT International Search Report for PCT/US2008/070248, (Oct. 16, 2008), 7 pgs.

*Primary Examiner* — Cam N Nguyen
(74) *Attorney, Agent, or Firm* — Karen M. Whitney; Diehl Servilla LLC; Melanie L. Brown

(57) ABSTRACT

A layered, three-way conversion catalyst having the capability of simultaneously catalyzing the oxidation of hydrocarbons and carbon monoxide and the reduction of nitrogen oxides is disclosed. Methods of making and using the same are also provided. In one or more embodiments, the catalyst comprises three layers of catalytic material in conjunction with a carrier. A first layer comprises a platinum component on a first support; a second layer comprises a rhodium component on a second support; and a third layer comprises a palladium component and a third support. The palladium, rhodium, and/or platinum can independently be deposited on a support of high surface area refractory metal oxide, or of an oxygen storage component, or both.

32 Claims, 1 Drawing Sheet

U.S. PATENT DOCUMENTS

| | | | | |
|---|---|---|---|---|
| 5,948,377 | A | 9/1999 | Sung | |
| 5,948,723 | A * | 9/1999 | Sung | 502/303 |
| 5,981,427 | A | 11/1999 | Sung et al. | |
| 5,989,507 | A | 11/1999 | Sung | |
| 6,087,298 | A * | 7/2000 | Sung et al. | 502/333 |
| 6,110,862 | A | 8/2000 | Chen et al. | |
| 6,248,688 | B1 | 6/2001 | Wu et al. | |
| 6,294,140 | B1 * | 9/2001 | Mussmann et al. | 423/213.5 |
| 6,348,430 | B1 * | 2/2002 | Lindner et al. | 502/304 |
| 6,375,910 | B1 * | 4/2002 | Deeba et al. | 423/239.1 |
| 6,413,483 | B1 * | 7/2002 | Brisley et al. | 423/239.1 |
| 6,492,297 | B1 | 12/2002 | Sung | |
| 6,497,851 | B1 * | 12/2002 | Hu et al. | 423/213.5 |
| 6,503,862 | B1 * | 1/2003 | Yamamoto | 502/65 |
| 6,514,905 | B1 | 2/2003 | Hanaki et al. | 502/328 |
| 6,524,992 | B2 | 2/2003 | Mussmann et al. | |
| 6,589,901 | B2 * | 7/2003 | Yamamoto et al. | 502/65 |
| 6,625,976 | B1 | 9/2003 | Anderson et al. | |
| 6,680,036 | B1 | 1/2004 | Fisher et al. | |
| 6,692,712 | B1 | 2/2004 | Anderson | |
| 6,764,665 | B2 * | 7/2004 | Deeba et al. | 423/239.1 |
| 6,777,370 | B2 * | 8/2004 | Chen | 502/241 |
| 6,881,384 | B1 * | 4/2005 | Uenishi et al. | 422/177 |
| 6,923,945 | B2 | 8/2005 | Chen | |
| 7,022,646 | B2 | 4/2006 | Li | |
| 7,189,376 | B2 | 3/2007 | Kumar et al. | |
| 7,276,212 | B2 * | 10/2007 | Hu et al. | 422/177 |
| 7,374,729 | B2 * | 5/2008 | Chen et al. | 422/177 |
| 7,501,098 | B2 * | 3/2009 | Chen et al. | 422/177 |
| 7,517,510 | B2 * | 4/2009 | Chen et al. | 423/213.2 |
| 7,524,465 | B2 * | 4/2009 | Kumar et al. | 422/180 |
| 7,550,124 | B2 * | 6/2009 | Chen et al. | 423/213.2 |
| 7,754,171 | B2 * | 7/2010 | Chen et al. | 423/213.2 |
| 7,758,834 | B2 * | 7/2010 | Chen et al. | 423/213.2 |
| 7,795,172 | B2 * | 9/2010 | Foong et al. | 502/327 |
| 2003/0021745 | A1 * | 1/2003 | Chen | 423/239.1 |
| 2003/0175192 | A1 | 9/2003 | Hu et al. | |
| 2004/0223897 | A1 | 11/2004 | Yeo | |
| 2005/0164879 | A1 | 7/2005 | Chen | |
| 2005/0227867 | A1 | 10/2005 | Chen et al. | |
| 2005/0282701 | A1 | 12/2005 | Foong et al. | |
| 2007/0014705 | A1 | 1/2007 | Chen | |
| 2007/0093382 | A1 | 4/2007 | Vanderspurt | |
| 2008/0044329 | A1 * | 2/2008 | Chen et al. | 423/213.2 |
| 2008/0044330 | A1 * | 2/2008 | Chen et al. | 423/213.5 |
| 2009/0175773 | A1 * | 7/2009 | Chen et al. | 423/213.5 |

FOREIGN PATENT DOCUMENTS

| | | |
|---|---|---|
| EP | 0665047 A1 | 8/1995 |
| JP | 62057651 A | 3/1987 |
| JP | 5277370 | 10/1993 |
| JP | 2003112049 A | 4/2003 |
| WO | WO-02/083301 A2 | 10/2002 |
| WO | WO-2006/009684 A1 | 1/2006 |
| WO | WO-2008/097702 A1 | 8/2008 |

* cited by examiner

MULTILAYERED CATALYST COMPOSITIONS

TECHNICAL FIELD

This invention pertains generally to layered catalysts used to treat gaseous steams containing hydrocarbons, carbon monoxide, and oxides of nitrogen. More specifically, this invention is directed to three-way conversion (TWC) catalysts having multiple layers, for example, three or more layers of catalytic material.

BACKGROUND

Catalytic converters are well known for the removal and/or conversion of the harmful components of exhaust gases. They typically contain a three-way conversion (TWC) catalyst and are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. TWC catalysts can be manufactured in many ways. U.S. Pat. No. 6,478,874, for example, sets forth a system for catalytic coating of a substrate. Details of a TWC catalyst are found in, for example, U.S. Pat. Nos. 4,714,694 and 4,923,842. U.S. Pat. Nos. 5,057,483; 5,597,771; 7,022,646; and WO95/35152 disclose TWC catalysts having two layers with precious metals. U.S. Pat. No. 6,764,665 discloses a TWC catalyst having three layers, including a palladium layer having substantially no oxygen storage components.

Multilayered catalysts are widely used in TWC. It is a continuing goal to develop three-way conversion catalyst systems that have the ability to oxidize hydrocarbons and carbon monoxide while reducing nitrogen oxides to nitrogen. There is also a goal to utilize components of TWC catalysts, especially the precious metals, as efficiently as possible. Further, there is an on-going need to develop catalyst architectures that meet ever more stringent emission standards set by various regulatory agencies, such as the proposed SULEV emissions regulations for $NO_x$ and HC emissions.

SUMMARY

The present invention relates to a layered catalyst composite of the type generally referred to as a three-way conversion catalyst having the capability of simultaneously catalyzing the oxidation of hydrocarbons and carbon monoxide and the reduction of nitrogen oxides. Methods of making such catalysts are also provided. In a first aspect of the present invention, the structure of the layered catalyst composite of the present invention is designed to have three layers of catalytic material in conjunction with a carrier, wherein the catalytic material is effective to substantially simultaneously oxidize carbon monoxide and hydrocarbons and reduce nitrogen oxides. The first layer comprises a precious metal selected from a platinum component on a first support. The second layer comprises a precious metal selected from a rhodium component on a second support. A third layer comprises a precious metal selected from a palladium component on a third support.

In an embodiment, the first support and the second support each independently comprises an oxygen storage component and the third support comprises a high surface area refractory metal oxide. Another embodiment provides that the first support and the second support each independently further comprises a high surface area refractory metal oxide, and the third support further comprises an oxygen storage component. The refractory metal oxide can comprise γ-alumina or promoter-stabilized γ-alumina having a specific surface area of about 50 to 300 m²/g. In a detailed embodiment, alumina present in the third support and is stabilized by baria, zirconia, lanthana, neodymia, or combinations thereof, the alumina being present in an amount in the range of 60 to 97% by weight in the layer. Another embodiment provides that the alumina comprises gamma alumina stabilized by baria, neodymia, and lanthana.

One or more embodiments provide that the first layer, the second layer, the third layer, or combinations thereof independently further comprises a second precious metal component.

In one or more embodiments, the first support and the second support each independently comprises a ceria-zirconia composite. Reference to a "ceria-zirconia composite" means a composite comprising ceria and zirconia, without specifying the amount of either component. Suitable ceria-zirconia composites include, but are not limited to, composites having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity).

In an embodiment, the first layer comprises platinum in an amount in the range of 0.1 to 5.0 (or in another embodiment, 0.5 to 2.0)% by weight in the layer and the oxygen storage component in an amount in the range of 15 to 90 (or in another embodiment, 15 to 50, or even 15 to 30)% by weight of the layer.

In certain embodiments, substantially all of the platinum component of the first layer is impregnated on the first support comprising the oxygen storage component. Other embodiments provide that at least a portion of the rhodium component of the second layer is impregnated on the second support comprising the oxygen storage component. Another embodiment provides that an amount of at least 25% of the rhodium component is impregnated on a high surface area refractory metal oxide. Further embodiments provide that a portion of the palladium component is impregnated on the high surface area refractory metal oxide. Reference to "impregnated" means that a precious metal-containing solution is put into pores of a support. In detailed embodiments, impregnation of precious metals is achieved by incipient wetness, where a volume of diluted precious metal-containing is approximately equal to the pore volume of the support bodies. Incipient wetness impregnation generally leads to a substantially uniform distribution of the solution of the precursor throughout the pore system of the support.

In one or more embodiments, the oxygen storage components of each of the layers independently comprises ceria, praseodymia, or combinations thereof. In a detailed embodiment, the first layer comprises the oxygen storage component in an amount that is greater than an amount of the oxygen storage component of the second layer.

In one or more embodiments, one layer of the catalytic material is deposited on the carrier to form an inner layer. A middle layer is deposited on the inner layer, and an outer layer is deposited on the middle layer.

In a detailed aspect, a layered catalyst composite is provided, comprising: a catalytic material on a carrier, wherein the catalytic material comprises: an inner layer deposited on the carrier comprising a palladium component on a high surface area refractory metal oxide support; a middle layer deposited on the inner layer comprising a platinum component on a middle layer support comprising an oxygen storage component; and an outer layer deposited on the middle layer comprising a rhodium component on an outer layer support comprising an oxygen storage component; wherein the catalytic material is effective to substantially simultaneously oxidize carbon monoxide and hydrocarbons and reduce nitrogen oxides. In a detailed embodiment, the middle layer further comprises a rhodium component.

In an embodiment, the high surface area refractory metal oxide support comprises an activated compound selected from the group consisting of alumina, silica, silica-alumina, alumino-silicates, alumina-zirconia, alumina-ceria-zirconia, lanthana-alumina, lanthana-zirconia-alumina, baria-alumina, baria-lanthana-alumina, baria-lanthana-neodymia-alumina, alumina-chromia, and alumina-ceria.

In another embodiment, the middle layer support comprising the oxygen storage component and the outer layer support comprising the oxygen storage component are each independently a ceria-zirconia composite.

For certain embodiments, the oxygen storage component is present in the middle layer in an amount in the range of 10 to 30% by weight of the layer and the oxygen storage component is present in the outer layer in an amount in the range of 10 to 30% by weight.

A detailed embodiment provides a composite, wherein the inner layer comprises baria-alumina in an amount in the range of 50 to 97% by weight of the layer, palladium in an amount in the range of 1.5 to 5% by weight of the layer, and one or more binders, promoters, or stabilizers in an amount in the range of 10.0 to 30.0% by weight of the layer; the middle layer comprises a ceria-zirconia composite in an amount in the range of 87 to 97% by weight of the layer, platinum in an amount in the range of 0.5 to 5% by weight of the layer, one or more binders, promoters, or stabilizers in an amount in the range of 2.0 to 7.0% by weight of the layer, wherein substantially all of the platinum is impregnated on the ceria-zirconia composite; and the outer layer comprises a ceria-zirconia composite in an amount in the range of 87 to 97% by weight of the layer, rhodium in an amount in the range of 0.5 to 2.5% by weight of the layer, one or more binders, promoters, or stabilizers an amount in the range of 2.0 to 6.0% by weight of the layer, wherein substantially all of the rhodium is impregnated on the ceria-zirconia composite.

Another aspect provides a layered catalyst composite comprising: a catalytic material on a carrier, wherein the catalytic material comprises: an inner layer deposited on the carrier comprising a platinum component on an inner layer support comprising an oxygen storage; a middle layer deposited on the inner layer comprising a rhodium component on both a middle layer support comprising an oxygen storage component and a middle layer high surface area refractory metal oxide support; and an outer layer deposited on the middle layer comprising a palladium component on both an outer layer support comprising an oxygen storage component and an outer layer a high surface area refractory metal oxide support; wherein the catalytic material is effective to substantially simultaneously oxidize carbon monoxide and hydrocarbons and reduce nitrogen oxides. In a detailed embodiment, the inner layer further comprises a rhodium component.

One or more embodiments provide that the middle layer high surface area refractory metal oxide support and the outer layer high surface area refractory metal oxide support each independently comprises an activated compound selected from the group consisting of alumina, silica, silica-alumina, alumino-silicates, alumina-zirconia, alumina-ceria-zirconia, lanthana-alumina, lanthana-zirconia-alumina, baria-alumina, baria lanthana-alumina, baria-lanthana-neodymia-alumina, alumina-chromia, and alumina-ceria.

In an embodiment, the oxygen storage component is present in the inner layer in an amount in the range of 15 to 45% by weight of the layer, the oxygen storage component is present in the middle layer in an amount in the range of 5 to 40% by weight of the layer and the oxygen storage component is present in the outer layer in an amount in the range of 1 to 25% by weight.

In a detailed embodiment, the inner layer comprises stabilized alumina in an amount in the range of 20 to 40% by weight of the layer, a ceria-zirconia composite in an amount in the range of 55 to 75% by weight of the layer, platinum in an amount in the range of 0.1 to 2.5% by weight of the layer, and one or more binders, promoters, or stabilizers in an amount in the range of 5.0 to 7.0% by weight of the layer, wherein substantially all of the platinum is impregnated on the ceria-zirconia composite; the middle layer comprises a ceria-zirconia composite in an amount in the range of 50 to 70% by weight of the layer, a stabilized alumina in an amount in the range of 20 to 40% by weight of the layer, rhodium in an amount in the range of 0.1 to 2.0% by weight of the layer, one or more binders, promoters, or stabilizers an amount in the range of 2.0 to 5.0% by weight of the layer, wherein an amount of at least 25% or more of the rhodium is impregnated on the stabilized alumina and the balance of the rhodium is impregnated on the ceria-zirconia composite; and the outer layer comprises stabilized alumina in an amount in the range of 60 to 90% by weight of the layer, a ceria-zirconia composite in an amount in the range of 8 to 40% by weight of the layer, palladium in an amount in the range of 0.5 to 10% by weight of the layer, one or more binders, promoters, or stabilizers an amount in the range of 1.5 to 7.0% by weight of the layer, wherein an amount of at least half of the palladium is impregnated on the stabilized alumina and the balance of the palladium is impregnated on the ceria-zirconia composite.

In a further aspect, a method for treating a gas comprising hydrocarbons, carbon monoxide, and nitrogen oxides comprises: contacting the gas with a catalytic material on a carrier, the catalytic material comprising three layers, wherein a first layer comprises a platinum component on a first support; a second layer comprises a rhodium component on a second support comprising an oxygen storage component; and a third layer comprises a palladium component and a third support; wherein the catalytic material is effective to substantially simultaneously oxidize the carbon monoxide and the hydrocarbons and reduce the nitrogen oxides. In a detailed embodiment, the gas is at a temperature of 1100 (or in other embodiments, 1000, or 900, or even 800)° C. or less. In one or more embodiments, the first support and the second support each independently comprises an oxygen storage component and the third support comprises a high surface area refractory metal oxide. In further embodiments, the first support and the second support each independently further comprises a high surface area refractory metal oxide, and the third support further comprises an oxygen storage component.

In another aspect, a method of making a layered catalyst composite, comprises providing a carrier and coating the carrier with first, second, and third layers of catalytic material; wherein the first layer is formed by impregnating a precious metal selected from a platinum component onto a first support comprising an oxygen storage component; the second layer is formed by impregnating a rhodium component on a second support comprising an oxygen storage component to form a second layer; and the third layer is formed by impregnating a precious metal selected from a palladium component on a third support. In one embodiment, the step of forming the second layer further comprises impregnating a portion of the rhodium on a high surface area refractory metal oxide. In another embodiment, the step of forming the third layer further comprises impregnating a portion of the palladium on an support comprising an oxygen storage component. A detailed embodiment provides depositing the first layer on the carrier, the second layer on the first layer, and the third layer on the second layer. Another detailed embodiment provides depositing the third layer on the carrier, the first layer on the third layer, and the second layer on the first layer.

A further aspect provides a method of making layered catalysts comprising barium as a stabilizer or a promoter, the method comprising depositing one or more inner coats on a substrate, preparing a slurry comprising one or more precious metal components, one or more supports, and barium tartarate, depositing the slurry on the one or more inner coats. In one or more embodiments, at lease one of the one or more inner coats is substantially free of barium. In certain embodiments, at least one of the inner coats comprises a precious metal component.

DETAILED DESCRIPTION

The present invention relates to a layered catalyst composite of the type generally referred to as a three-way conversion catalyst having the capability of simultaneously catalyzing the oxidation of hydrocarbons and carbon monoxide and the reduction of nitrogen oxides. It has been found that the use of a trimetal catalyst having a palladium (Pd)-containing layer, a platinum (Pt)-containing layer, and a rhodium (Rh)-containing layer provides excellent conversion of $NO_x$ and hydrocarbons for SULEV applications where $NO_x$ and hydrocarbons emissions are tightly regulated. Without attempting to be bound by theory, it is thought that the Pt-containing layer promotes, for example, $NO_x$ reduction by hydrogen generated through water gas shift (WGS) as shown in Formula I:

(I), and assists, for example, hydrocarbon conversion by steam through steam reforming reaction (SRR). Another benefit is the availability of hydrogen to help Rh regeneration from much less active $Rh^{+3}$ to active $Rh^0$ so that Rh functionality can be maximized. The thermal-neutral nature of the WGS and the endothermic nature of the SRR help to reduce hydrothermal aging severity for the Pd- and Rh-containing layers where exothermic carbon monoxide (CO) and hydrocarbon oxidation can generate heat resulting in damage to precious metal components and to other materials of the catalyst layer.

In one or more embodiments, the gas is located in an exhaust system of an automobile and is at a temperature of 1100 (or in other embodiments, 1000, or 900, or even 800)° C. or less.

In a first aspect of the present invention, the structure of the layered catalyst composite of the present invention is designed to have three layers in conjunction with a carrier. The three layers are made up of three compositions: a first layer deposited on a carrier; a second layer deposited on the first layer; and a third layer deposited on the second layer. Among the three layers, there are three different precious metals, Pt, Pd, and Rh, one in each layer. Optionally, as needed, one or more additional precious metals can be added to each layer.

Reference to a "support" in a catalyst layer refers to a material onto or into which precious metals, stabilizers, promoters, binders, and the like are dispersed or impregnated, respectively. Examples of supports include, but are not limited to, high surface area refractory metal oxides and composites containing oxygen storage components. One or more embodiments of the present invention include a high surface area refractory metal oxide support comprising an activated compound selected from the group consisting of alumina, silica, silica-alumina, alumino-silicates, alumina-zirconia, alumina-ceria-zirconia, lanthana-alumina, lanthana-zirconia-alumina, baria-alumina, baria-lanthana-alumina, baria-lanthana-neodymia-alumina, alumina-chromia, and alumina-ceria.

Figure 1:
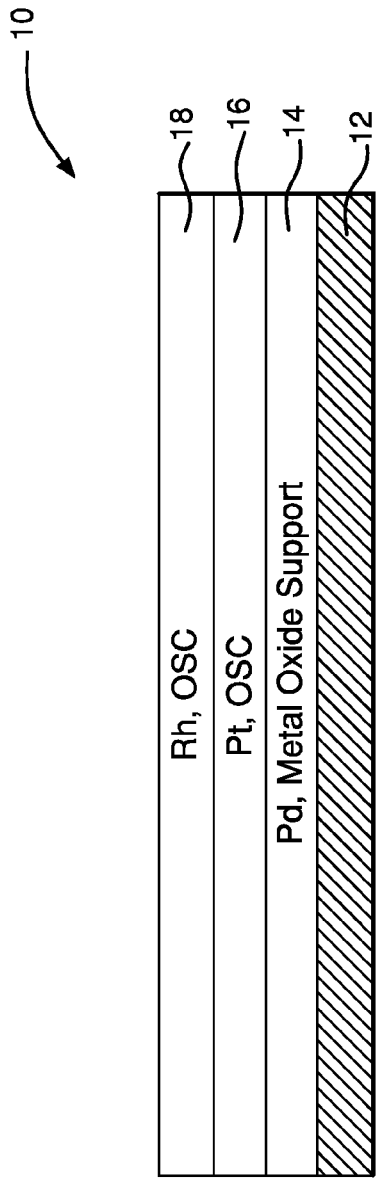
FIG. 1 is a schematic view showing a configuration of layers on a catalytic member of an exhaust gas treatment system.

The catalytic composite according to an embodiment of the invention may be more readily appreciated by reference to the Figures, which are merely exemplary in nature and in no way intended to limit the invention or its application or uses. Referring in particular to FIG. 1, a configuration of the catalytic member 10 of an exhaust gas treatment system is shown in accordance with one embodiment of the present invention. The catalytic member 10 comprises a substrate 12, typically a honeycomb monolith substrate, which is coated with an inner washcoat layer 14, containing a palladium component and a metal oxide support, such as a high surface area refractory metal oxide, for example, an alumina-based support; a middle washcoat layer 16 containing a platinum component, a support having an oxygen storage component (OSC); and an outer layer 18 containing a rhodium component and a support having an OSC. The precious metal catalysts and oxygen storage components used in the practice of embodiments of the present invention are discussed in more detail below.

Figure 2:
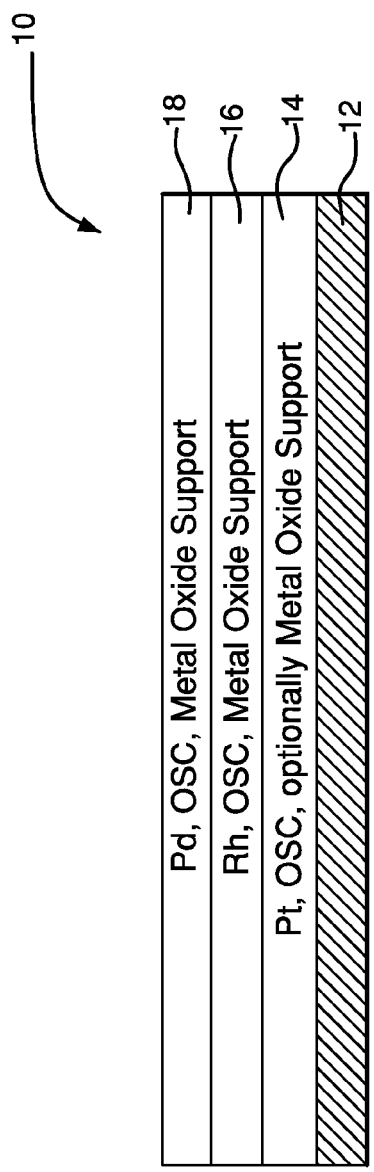
FIG. 2 is a schematic view showing another configuration of layers on a catalytic member according to an embodiment of the present invention.

In FIG. 2, a configuration of the catalytic member 10 of an exhaust gas treatment system is shown in accordance with one embodiment of the present invention. In this embodiment, the catalytic member 10 comprising a substrate 12, typically a honeycomb monolith substrate, is coated with the inner layer 14 containing platinum component and a support having an oxygen storage component (OSC) optionally a metal oxide support; the middle layer 16 containing a rhodium component, a support having an OSC, and a metal oxide support comprising, for example, a high surface area refractory metal oxide; and the outer layer 18 containing a palladium component and a metal oxide support, and a support comprising an OSC.

Details of the components of a catalyst composite according to embodiments of the invention are provided below.

The Carrier

According to one or more embodiments, the carrier may be any of those materials typically used for preparing TWC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 900 or more gas inlet openings (i.e., "cells") per square inch of cross section.

The ceramic carrier may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α-alumina, aluminosilicates and the like.

The carriers useful for the layered catalyst composites of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15% by weight of the alloy, e.g., 10-25% by weight of chromium, 3-8% by weight of aluminum and up to 20% by weight of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

Preparation of the Layered Catalyst Composite

The layered catalyst composite of the present invention may be readily prepared by processes well known in the prior art, see for example U.S. Patent Publication No. 2004/0001782, incorporated herein by reference in its entirety. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated.

The catalyst composite can be readily prepared in layers on a monolithic carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 400-600° C. for about 1 to about 3 hours. Typically, when palladium is desired, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound or palladium and platinum compounds) and at least one finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., ceria-zirconia composite, a stabilizer, e.g., barium acetate or nitrate, and a promoter, e.g., lanthanum acetate or nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 15-60% by weight, more particularly about 25-40% by weight.

Additional layers may be prepared and deposited upon the first layer in the same manner as described above for deposition of the first layer upon the carrier.

The catalytic layers may also contain binders, stabilizers and promoters, as desired. Suitable stabilizers include one or more non-reducible metal oxides wherein the metal is selected from the group consisting of barium, calcium, magnesium, strontium, lanthanum, and mixtures thereof. Preferably, the stabilizer comprises one or more oxides of barium and/or strontium. Suitable promoters include one or more non-reducible oxides of one or more rare earth metals selected from the group consisting of lanthanum, zirconium, praseodymium, yttrium, and mixtures thereof. Barium can be used as a promoter also, for palladium, for example. Suitable binders can be alumina-based and/or zirconia based.

A catalytic layer may also contain an oxygen storage component. Reference to OSC (oxygen storage component)

refers to an entity that has multi-valence state and can actively react with oxidants such as oxygen or nitrous oxides under oxidative conditions, or reacts with reductants such as carbon monoxide (CO) or hydrogen under reduction conditions. Typically, the oxygen storage component will comprise one or more reducible oxides of one or more rare earth metals. Examples of suitable oxygen storage components include ceria, praseodymia, or combinations thereof. Delivery of ceria into the layer can be achieved by the use of, for example, ceria, a mixed oxide of cerium and zirconium (e.g., a ceria-zirconium composite), and/or a mixed oxide of cerium, zirconium, and neodymium.

Unless otherwise indicated, all numbers expressing quantities of ingredients, reaction conditions, and so forth used in the specification and claims are to be understood as being modified in all instances by the term "about."

Before describing several exemplary embodiments of the invention, it is to be understood that the invention is not limited to the details of construction or process steps set forth in the following description. The invention is capable of other embodiments and of being practiced in various ways.

EXAMPLES

The following non-limiting examples shall serve to illustrate the various embodiments of the present invention. In each of the examples, the carrier was cordierite.

Example 1

A composite having a catalytic material was prepared using three layers: an inner layer, a middle layer, and an outer layer. In this example, the composition is generally referred to as Pd/Pt/(Rh—Pt). The layered catalyst composite contained platinum, palladium, and rhodium with a total precious metal loading of 100 g/ft$^3$ and with a Pt/Pd/Rh ratio of 30/50/20. The substrate had a volume of 61.1 in$^3$ (1 L), a cell density of 900 cells per square inch, and a wall thickness around 64 μm. The layers were prepared as follows:

Inner Layer

The components present in the inner layer were a baria-stabilized high surface area stabilized gamma alumina, palladium, strontium oxide, zirconium oxide, neodymium oxide, and lanthanum oxide at concentrations of approximately 75.0%, 1.6%, 7.2%, 2.2%, 6.7%, and 7.2%, respectively, based on the calcined weight of the catalyst. Strontium oxide was introduced as an acetate solution and as a hydroxide solution. Zirconium oxide was introduced as an acetate colloidal solution. Neodymium oxide was introduced as a nitrate solution. Lanthanum oxide was introduced as a nitrate solution. The total loading of the inner layer was 1.8 g/in$^3$. There was no OSC (oxygen storage component) content in the layer.

The palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 12 microns. The slurry was coated onto a cordierite carrier using deposition methods known in the art for depositing the catalyst on a cordierite substrate. After coating, the carrier plus the inner layer were dried and then calcined at a temperature of 550° C. for no less than 1 hour.

Middle Layer

The components present in the middle layer were high surface area stabilized gamma alumina, a ceria-zirconia composite with 5% each of ceria and praseodymia by weight, platinum, and zirconium oxide, at concentrations of approximately 48.4%, 48.4%, 2.0%, and 1.2%, respectively, based on the calcined weight of the catalyst. Zirconium oxide was introduced as an acetate colloidal solution. The total loading of the middle layer was 0.83 g/in$^3$. The OSC content in the layer was low at approximately 4.8% based on the ceria and praseodymia present.

Platinum in the form of a platinum amine hydroxide solution was impregnated by planetary mixer (P-mixer) onto both the stabilized alumina and the ceria-zirconia composite in a 2:1 ratio to form a wet powder while achieving incipient wetness. An aqueous slurry was formed by combining the above components with water and under conditions of a pH<4.5, and milling to a particle size of 90% less than 12 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for no less than 1 hour.

Outer Layer

The components present in the outer layer were a ceria-zirconia composite with 5% each of ceria and praseodymia by weight, a ceria-zirconia composite with 30% ceria and 7.5% praseodymia by weight, rhodium, platinum, a binder, and zirconium oxide, at concentrations of approximately 47.5%, 47.5%, 1.0%, 0.1%, 3.0%, and 0.9%, respectively, based on the calcined weight of the catalyst. Zirconium oxide was introduced as a nitrate colloidal solution. The total loading of the outer layer was 1.2 g/in$^3$. The OSC content in the layer was approximately 22.5% based on the ceria and praseodymia present.

The rhodium in the form of a rhodium nitrate solution was impregnated by planetary mixer (P-mixer) onto the two ceria-zirconia composites to form a wet powder while achieving incipient wetness. An aqueous slurry was formed by combining all of the above components with water and under conditions of a pH<4.5, and milling to a particle size of 90% less than 12 microns. After milling, platinum was added as platinum nitrate solution with binder into the slurry and mixed well. The slurry then was coated onto the cordierite carrier over the middle layer using deposition methods known in the art for depositing the catalyst on a cordierite substrate. After coating, the carrier plus the inner, middle, and outer layers were dried, and then calcined at a temperature of 550° C. for no less than 1 hour.

Example 2

A composite having a catalytic material was prepared using three layers: an inner layer, a middle layer, and an outer layer. In this example, the composition is generally referred to as Pd/Pt/Rh. The layered catalyst composite contained platinum, palladium, and rhodium with a total precious metal loading of 100 g/ft$^3$ and with a Pt/Pd/Rh ratio of 20/60/20. The substrate had a volume of 61.1 in$^3$ (1 L), a cell density of 900 cells per square inch, and a wall thickness around 64 μm. The layers were prepared as follows:

Inner Layer

The components present in the inner layer were a baria-stabilized high surface area stabilized gamma alumina, palladium, strontium oxide, zirconium oxide, neodymium oxide, and lanthanum oxide at concentrations of approximately 72.5%, 2.1%, 7.9%, 2.4%, 7.3%, and 7.9%, respectively, based on the calcined weight of the catalyst. The last four components were introduced as acetate, nitrate, and/or hydroxide colloidal solutions. The total loading of the inner layer was 1.7 g/in³. There was no OSC (oxygen storage component) content in the layer.

The palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 12 microns. The slurry was coated onto a cordierite carrier using deposition methods known in the art for depositing the catalyst on a cordierite substrate. After coating, the carrier plus the inner layer were dried and then calcined at a temperature of 550° C. for no less than 1 hour.

Middle Layer

The components present in the middle layer were a ceria-zirconia composite with 20% ceria by weight, platinum, a binder, and zirconium oxide at concentrations of approximately 94.2%, 1.4%, 3.3%, and 1.2%, respectively, based on the calcined weight of the catalyst. Zirconium oxide was introduced as an acetate colloidal solution. The total loading of the middle layer was 0.85 g/in³. The OSC content in the layer was approximately 18.8% based on the ceria present, an amount higher than that of the middle layer of Example 1.

An amount of 100% of the platinum in the form of a platinum amine hydroxide solution was impregnated by planetary mixer (P-mixer) onto the ceria-zirconia composite to form a wet powder while achieving incipient wetness. An aqueous slurry was formed by combining all of the above components with water and under conditions of a pH<4.5, and milling to a particle size of 90% less than 12 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for no less than 1 hour.

Outer Layer

The components present in the outer layer were a ceria-zirconia composite with 5% each of ceria and praseodymia by weight, a ceria-zirconia composite with 30% ceria and 7.5% praseodymia by weight, rhodium, a binder, and zirconium oxide, at concentrations of approximately 47.6%, 47.6%, 1.0%, 3.0%, and 0.9%, respectively, based on the calcined weight of the catalyst. Zirconium oxide was introduced as a nitrate colloidal solution. The total loading of the outer layer was 1.2 g/in³. The OSC content in the layer was approximately 22.5% based on the ceria and praseodymia present.

An amount of one-half of the rhodium in the form of a rhodium nitrate solution was impregnated by planetary mixer (P-mixer) onto the ceria-zirconia composite with 30% ceria and 7.5% praseodymia by weight to form a wet powder while achieving incipient wetness. The remainder of the rhodium in the form of a rhodium nitrate solution was impregnated by the P-mixer onto the ceria-zirconia composite with 5% each of ceria and praseodymia by weight to form a wet powder while achieving incipient wetness. An aqueous slurry was formed by combining all of the above components with water and under conditions of a pH<4.5, and milling to a particle size of 90% less than 12 microns. After milling, platinum was added as platinum nitrate solution with binder into the slurry and mixed well. The slurry was then coated onto the cordierite carrier over the middle layer using deposition methods known in the art for depositing the catalyst on a cordierite substrate. After coating, the carrier plus the inner, middle, and outer layers were dried, and then calcined at a temperature of 550° C. for no less than 1 hour.

Example 3

Comparative Example

A composite having a catalytic material was prepared using two layers: an inner layer and an outer layer which together have approximately the same loadings of individual components, e.g., alumina, platinum, palladium, rhodium, ceria, as described in Example 1. In this example, the composition is generally referred to as (Pt—Pd)/Rh. The layered catalyst composite contained platinum, palladium, and rhodium with a total precious metal loading of 100 g/ft³ and with a Pt/Pd/Rh ratio of 20/60/20. The substrate had a volume of 61.1 in³ (1 L), a cell density of 900 cells per square inch, and a wall thickness around 64 μm. In this comparative example, the layers were as follows:

Inner Layer

The components present in the inner layer were a baria-stabilized high surface area stabilized gamma alumina, a ceria-zirconia composite with 20% ceria by weight, palladium, platinum, and strontium oxide at concentrations of approximately 58.9%, 33.7%, 1.5%, 0.5%, and 5.5%, respectively, based on the calcined weight of the catalyst. Strontium oxide was introduced as a nitrate solution. The total loading of the inner layer was 2.4 g/in³. The OSC content in the layer was approximately 6.7% based on the ceria present.

Palladium in the form of a palladium nitrate solution was impregnated by planetary mixer (P-mixer) onto the stabilized alumina to form a wet powder while achieving incipient wetness. Platinum in the form of a platinum amine hydroxide solution was substantially all impregnated by a P-mixer onto the ceria-zirconia composite to form a wet powder while achieving incipient wetness. An aqueous slurry was formed by combining all of the above components with water, acidifying to a pH<4.5, and milling to a particle size of 90% less than 12 microns. The slurry was coated onto a cordierite carrier using deposition methods known in the art for depositing the catalyst on a cordierite substrate. After coating, the carrier plus the inner layer were dried and then calcined at a temperature of 550° C. for no less than 1 hour.

Outer Layer

The outer layer had the same composition and slurry preparation as the outer layer of Example 2. After coating, the carrier plus the inner and outer layers were dried, and calcined at a temperature of 550° C. for no less than 1 hour.

Example 4

Comparative Example

A composite having a catalytic material was prepared using two layers: an inner layer and an outer layer which together have approximately the same loadings of individual components, e.g., alumina, platinum, palladium, rhodium, ceria, as described in Example 2. In this example, the composition is generally referred to as Pd/(Pt—Rh). The layered catalyst composite contained platinum, palladium, and rhodium with a total precious metal loading of 100 g/ft³ and with a Pt/Pd/Rh ratio of 20/60/20. The substrate had a volume of 61.1 in³ (1 L), a cell density of 900 cells per square inch, and a wall thickness around 64 μm. In this comparative example, the layers were as follows:

Inner Layer

The inner layer had the same composition and slurry preparation as the inner layer of Example 2. After coating, the carrier plus the inner layer were dried, and then calcined at a temperature of 550° C. for no less than 1 hour.

Outer Layer

The components present in the outer layer were a ceria-zirconia composite with 20% ceria by weight, a ceria-zirconia composite with 30% ceria and 7.5% praseodymia by weight, a ceria-zirconia composite with 5% each of ceria and praseodymia by weight, rhodium, platinum, a binder, and zirconium oxide, at concentrations of approximately 39.5%, 27.6%, 27.6%, 0.6%, 0.6%, 3.2% and 1.0%, respectively, based on the calcined weight of the catalyst. Zirconium oxide was introduced as a nitrate colloidal solution and an acetate colloidal solution. The total loading of the outer layer was 2.0 g/in$^3$. The OSC content in the layer was approximately 21% based on the ceria and praseodymia present.

An amount of one-half of the rhodium in the form of a rhodium nitrate solution was impregnated by planetary mixer (P-mixer) onto the ceria-zirconia composite with 30% ceria and 7.5% praseodymia by weight to form a wet powder while achieving incipient wetness. The remainder of the rhodium in the form of a rhodium nitrate solution was impregnated by the P-mixer onto the ceria-zirconia composite with 5% by weight each of ceria and praseodymia content to form a wet powder while achieving incipient wetness. Platinum in the form of a platinum amine hydroxide solution was substantially all impregnated by a P-mixer onto the ceria-zirconia composite with 20% by weight ceria to form a wet powder while achieving incipient wetness. An aqueous slurry was formed by combining the above platinum and rhodium components with water, zirconia nitrate and binder sequentially, acidifying the slurry to conditions of a pH<4.5, and milling to a particle size of 90% less than 12 microns. The slurry was coated onto the cordierite carrier over the inner layer using deposition methods known in the art for depositing the catalyst on a cordierite substrate. After coating, the carrier plus the inner and outer layers were dried, and then calcined at a temperature of 550° C. for no less than 1 hour.

Example 5

Testing

The catalyst composites prepared in Examples 1, 2, 3, and 4 were engine aged with fuel-cut feature for 150 hours at a maximum bed temperature of around 920° C. After aging, the composites were evaluated on a laboratory vehicle with a 2.2 L engine with which FTP drive cycles were conducted.

Hydrocarbon, CO, and NO$_x$ emissions were measured and recorded second-by-second throughout FTP cycles and cumulative results were calculated and listed in Table 1 as follows:

TABLE 1

|  | HC (modal mg/mi) | CO/10 (modal mg/mi) | NO$_x$ (modal mg/mi) |
| --- | --- | --- | --- |
| Example 1 | 28 | 34 | 62 |
| Example 2 | 20 | 22 | 21 |
| Example 3 | 34 | 50 | 74 |
| Example 4 | 28 | 47 | 40 |

Table 1 shows that the three-layered composite of Example 2 has substantially better and lower emissions than the others. When the two-layered catalysts, Examples 3 and 4, having nominally the same composition as the three-layered catalysts by combining either the inner two layers (Example 3) or outer two layers (Example-4), the HC/CO/NOx activity dropped off significantly. In addition, using positive interaction of platinum with OSC for promoting WGS and SRR also decreased emissions. The Pt was predominantly impregnated on the ceria-zirconia composite (20% ceria) of Example 2 showed lower emissions of HC, CO, and NO$_x$ than the catalyst of Example 1, which contained 67% Pt on non-OSC alumina and 33% on the ceria-zirconia composite (5% ceria).

Example 6

A composite having a catalytic material was prepared using three layers: an inner layer, a middle layer, and an outer layer. In this example, the composition is generally referred to as Pt/Rh/Pd. The layered catalyst composite contained platinum, palladium, and rhodium with a total precious metal loading of 50 g/ft$^3$ and with a Pt/Pd/Rh ratio of approximately 3/3/1. The substrate had a volume of 53.4 in$^3$ (0.875 L), a cell density of 600 cells per square inch, and a wall thickness around 90 μm. The layers were prepared as follows:

Inner Layer

The components present in the inner layer were gamma alumina, a ceria-zirconia composite with 45% ceria and 2% praseodymia by weight, platinum, and zirconium oxide at concentrations of approximately 33.1%, 60.2%, 0.7%, and 6.0%, respectively, based on the calcined weight of the catalyst. Zirconium oxide was introduced as an acetate colloidal solution. The total loading of the inner layer was 1.7 g/in$^3$. The OSC (oxygen storage component) content in the layer was approximately 28.3% based on the ceria present.

Platinum in the form of a platinum amine hydroxide solution was impregnated predominantly by planetary mixer (P-mixer) onto the ceria-zirconia composite to form a wet powder while achieving incipient wetness. An aqueous slurry was formed by combining all of the above components with water and under conditions of a pH<4.5, and milling to a particle size of 90% less than 12 microns. The slurry was coated onto the cordierite carrier using deposition methods known in the art for depositing the catalyst on a cordierite substrate. After coating, the carrier plus the inner were dried, and then calcined at a temperature of 550° C. for no less than 1 hour.

Middle Layer

The components present in the middle layer were a ceria-zirconia composite with 40% ceria and 5% praseodymia by weight, a ceria-zirconia composite with 5% each of ceria and praseodymium by weight, a stabilized alumina, rhodium, a binder, and zirconium oxide at concentrations of approximately 20.1%, 40.2%, 36.2%, 0.3%, 2.4%, and 0.8%, respectively, based on the calcined weight of the catalyst. Zirconium oxide was introduced as a nitrate colloidal solution. The total loading of the middle layer was 1.2 g/in$^3$. The OSC content in the layer was approximately 13% based on the ceria and praseodymia present.

An amount of approximately 75% of the rhodium in the form of a rhodium nitrate solution was impregnated by planetary mixer (P-mixer) onto the stabilized alumina to form a wet powder while achieving incipient wetness. The remainder of the rhodium in the form of a rhodium nitrate solution was impregnated by a P-mixer onto the mixture of above mentioned two ceria-zirconia composites to form a wet powder while achieving incipient wetness. An aqueous slurry was formed by combining all of the above components with water and under conditions of a pH<4.5, and milling to a particle size of 90% less than 12 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for no less than 1 hour.

Outer Layer

The components present in the outer layer were high surface area stabilized gamma alumina, a ceria-zirconia composite with 40% ceria and 5% praseodymia by weight, palladium, a binder, strontium oxide, and zirconium oxide, at concentrations of approximately 75.4%, 20.1%, 0.9%, 2.1%, 0.7%, and 0.7%, respectively, based on the calcined weight of the catalyst. Strontium oxide was introduced as hydroxide salts while zirconium oxide was introduced as a nitrate colloidal solution. The total loading of the outer layer was 1.4 g/in$^3$. The OSC content in the layer was approximately 9% based on the ceria and praseodymia present.

An amount of 95% of the palladium in the form of a palladium nitrate solution was impregnated by planetary mixer (P-mixer) onto the stabilized alumina to form a wet powder while achieving incipient wetness. The remainder of the palladium in the form of a palladium nitrate solution was impregnated by the P-mixer onto the ceria-zirconia composite with to form a wet powder while achieving incipient wetness. An aqueous slurry was formed by combining the above Pd-containing components with water containing strontium hydroxide and mixed well for at least 5 minutes before zirconium nitrate was introduced. The slurry then was acidified to a pH<4.5, and milling to a particle size of 90% less than 12 microns. The slurry was coated onto the cordierite carrier over the middle layer using deposition methods known in the art for depositing the catalyst on a cordierite substrate. After coating, the carrier plus the inner, middle, and outer layers were dried, and then calcined at a temperature of 550° C. for no less than 1 hour.

Example 7

Comparative Example

A composite having a catalytic material was prepared using three layers: an inner layer, a middle layer, and an outer layer. In this example, the composition is generally referred to as UC/Pd/Rh (where "UC" in this example refers to a precious-metal free undercoat). The layered catalyst composite contained platinum, palladium, and rhodium with a total precious metal loading of 50 g/ft$^3$ and with a Pt/Pd/Rh ratio of approximately 3/3/1. The substrate had a volume of 53.4 in$^3$ (0.875 L), a cell density of 600 cells per square inch, and a wall thickness around 90 μm. In this comparative example, the layers were as follows:

Inner Layer

The components present in the inner layer were high surface area gamma alumina, a binder, and zirconium oxide, at concentrations of approximately 86.4%, 7.4%, and 6.2%, respectively, based on the calcined weight of the catalyst. Zirconium oxide was introduced as an acetate colloidal solution. The total loading of the outer layer was 0.81 g/in$^3$. There was no OSC content in the layer.

An aqueous slurry was formed by combining all of the above components with water, acidifying to a pH<4.5, and milling to a particle size of 90% less than 12 microns. The slurry was coated onto the cordierite carrier using deposition methods known in the art for depositing the catalyst on a cordierite substrate. After coating, the carrier plus the inner layer were dried, and then calcined at a temperature of 430° C. for about 1 hour.

Middle Layer

The components present in the middle layer were high surface area stabilized gamma alumina, a ceria-zirconia composite with 47% ceria by weight, palladium, barium oxide, and zirconium oxide at concentrations of approximately 40.2%, 50.2%, 0.9%, 6.7%, and 2.0%, respectively, based on the calcined weight of the catalyst. Zirconium oxide was introduced as a nitrate colloidal solution. Barium oxide was added as a barium tartarate solution/suspension as an alternative to using a barium acetate solution. Because Ba is less soluble in the form of a tartarate salt as compared with an acetate salt, and without intending to be limited by theory, it is thought that the ability of the Ba to migrate to lower layers and thereby interact with precious metals and/or OSC detrimentally is reduced when using a tartarate solution/suspension compared with an acetate solution. The total loading of the inner layer was 1.5 g/in$^3$. The OSC (oxygen storage component) content in the layer was approximately 23.6% based on the ceria present.

Palladium in the form of a palladium nitrate solution was impregnated by planetary mixer (P-mixer) onto the stabilized alumina to form a wet powder while achieving incipient wetness. An aqueous slurry was formed by combining all of the above components with water under conditions of a pH<4.5, and milling to a particle size of 90% less than 12 microns. The slurry was coated onto the first layer using deposition methods known in the art for depositing the catalyst on a cordierite substrate. After coating, the carrier plus the inner and middle layers were dried and then calcined at a temperature of 550° C. for no less than 1 hour.

Outer Layer

The components present in the outer layer were high surface area stabilized gamma alumina, a ceria-zirconia composite with 5% each of ceria and praseodymia by weight, rhodium, and zirconium oxide, at concentrations of approximately 62.2%, 31.1%, 0.4%, and 6.2%, respectively, based on the calcined weight of the catalyst. The last component was introduced as a nitrate colloidal solution. The total loading of the outer layer was 0.8 g/in$^3$. The OSC content in the layer was approximately 3% based on the ceria and praseodymia present.

An amount of approximately 90% of the rhodium in the form of a rhodium nitrate solution was impregnated by planetary mixer (P-mixer) onto the stabilized alumina to form a wet powder while achieving incipient wetness. The remainder 10% of the rhodium in the form of a rhodium nitrate solution was impregnated by planetary mixer (P-mixer) onto the ceria-zirconia composite to form a wet powder while achieving incipient wetness. An aqueous slurry was formed by combining all of the above components with water and under conditions of a pH<4.5, and milling to a particle size of 90% less than 12 microns. The slurry was coated onto the cordierite carrier over the inner layer using deposition methods known in the art for depositing the catalyst on a cordierite substrate. After coating, the carrier plus the inner, middle, and outer layers were dried, and then calcined at a temperature of 550° C. for no less than 1 hour.

After forming the triple-layered structure, platinum was further introduced by dipping the entire triple-layered catalyst into a solution containing platinum amine hydroxide solution having sufficient platinum component to reach a loading of 21.2 g/ft$^3$ or of 0.0033 g/in$^3$. The platinum introduced by this method was expected to distributed in all of the components in all layers instead of being located in a single layer as in Example 6.

Example 8

The catalyst composites prepared in Examples 6 and 7 were engine-aged for 50 hours at a maximum bed temperature of 1000° C. After aging, the catalyst composites were evaluated using engine laboratory system with one bank of 8 cylinder engine equivalent to a 4 cylinder 2.3 L engine. The evaluations include lambda transients (sweep) test and temperature transient (light-off) test. The sweep test used engine exhaust gas conditions in which the set-point (mid-point) of air/fuel (A/F) ratio was changed from lean to rich at a constant rate. Also, the A/F ratio was kept swinging between lean and rich with constant amplitude (±1 A/F ratio), frequency (1 Hz), flow rate (VHSV of 100,000/hr), and inlet temperature (400° C.). The crossover points of CO/NOx and HC/NOx are recorded and listed in Table 2.

The light-off test used engine exhaust gas conditions in which the temperature was rapidly (~100° C./minute heat-up rate) raised to 500° C. Temperatures at which HC, CO, and $NO_x$ each reached 50% conversion were measured and recorded as $T_{50}$. Those results are compared and provided in Tables 2 and 3

TABLE 2

| Cross-over Conversion | $CO/NO_x$ % | $HC/NO_x$ % |
|---|---|---|
| Example 6 | 82 | 87 |
| Example 7 | 66 | 78 |

TABLE 3

| | HC $T_{50}$° C. | CO $T_{50}$° C. | $NO_x$ $T_{50}$° C. |
|---|---|---|---|
| Example 6 | 391 | 375 | 377 |
| Example 7 | 404 | 394 | 395 |

Tables 2 and 3 indicate that the composite of Example 6 shows improved conversions of HC, CO, and $NO_x$ compared to the composite of Example 7. Improved three-way conversion activity was achieved by using the separate Pt layer of Example 6, where platinum was distributed predominantly on the OSC/ceria-zirconia composite, in contrast to Pt being dispersed among the three layers, as provided by Example 7

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. A layered catalyst composite comprising:
a catalytic material on a carrier, the catalytic material comprising first, second, and third layers, the first layer comprising a precious metal selected from a platinum component on a first support, the second layer comprising a precious metal selected from a rhodium component on a second support, and a third layer comprising a precious metal selected from a palladium component on a third support, wherein the catalytic material is effective to substantially simultaneously oxidize carbon monoxide and hydrocarbons and reduce nitrogen oxides.

2. The composite of claim 1, wherein the first support and the second support each independently comprises an oxygen storage component and the third support comprises a high surface area refractory metal oxide.

3. The composite of claim 2, wherein the first support and the second support each independently further comprises a high surface area refractory metal oxide, and the third support further comprises an oxygen storage component.

4. The composite of claim 2, wherein the first layer comprises platinum in an amount in the range of 0.1 to 5.0% and the oxygen storage component in an amount in the range of 15 to 90% by weight of the layer.

5. The composite of claim 2, wherein substantially all of the platinum component of the first layer is impregnated on the first support comprising the oxygen storage component.

6. The composite of claim 2, wherein a portion of the rhodium component of the second layer is impregnated on the second support comprising the oxygen storage component.

7. The composite of claim 6, wherein the second support further comprises a high surface area refractory metal oxide, and an amount of at least 25% of the rhodium component is impregnated on the high surface area refractory metal oxide.

8. The composite of claim 2, wherein a portion of the palladium component is impregnated on the high surface area refractory metal oxide of the third support.

9. The composite of claim 2, wherein the oxygen storage component of the first layer and the oxygen storage of the second layer each independently comprises ceria, praseodymia, or combinations thereof.

10. The composite of claim 2, wherein the first layer comprises the oxygen storage component in an amount that is greater than an amount of the oxygen storage component of the second layer.

11. The composite of claim 1 wherein the third support comprises a metal oxide comprising γ-alumina or promoter-stabilized γ-alumina having a specific surface area of about 50 to 300 m²/g.

12. The composite of claim 11 wherein the alumina present in the third support is stabilized by baria, zirconia, lanthana, neodymia, or combinations thereof, the alumina being present in an amount in the range of 60 to 97% by weight in the layer.

13. The composite of claim 12 wherein the alumina comprises gamma alumina stabilized by baria, neodymia, and lanthana.

14. The composite of claim 13, wherein the first layer comprises the oxygen storage component in an amount in the range of 15 to 30% by weight of the layer.

15. The composite of claim 12, wherein the first layer comprises the oxygen storage component in an amount in the range of 15 to 50% by weight of the layer.

16. The composite of claim 1, wherein the first layer, the second layer, the third layer, or combinations thereof independently further comprises a second precious metal component.

17. A layered catalyst composite comprising: a catalytic material on a carrier, the catalytic material comprising an inner layer deposited on the carrier comprising a palladium component on a high surface area refractory metal oxide support; a middle layer deposited on the inner layer comprising a platinum component on a middle layer support comprising an oxygen storage component; and an outer layer deposited on the middle layer comprising a rhodium component on an outer layer support comprising an oxygen storage component, wherein the catalytic material is effective to substantially simultaneously oxidize carbon monoxide and hydrocarbons and reduce nitrogen oxides.

18. The composite of claim 17, wherein the middle layer further comprises a rhodium component.

19. The composite of claim 17, wherein the high surface area refractory metal oxide support of the inner layer comprises an activated compound selected from the group consisting of alumina, silica, silica-alumina, alumino-silicates, alumina-zirconia, alumina-ceria-zirconia, lanthana-alumina, lanthana-zirconia-alumina, baria-alumina, baria-lanthana-alumina, baria-lanthana-neodymia alumina, alumina-chromia, and alumina-ceria.

20. The composite of claim 17, wherein the middle layer support comprising the oxygen storage component and the outer layer support comprising the oxygen storage component are each independently a ceria-zirconia composite.

21. The composite of claim 17, wherein the oxygen storage component is present in the middle layer in an amount in the range of 10 to 30% by weight of the layer and the oxygen storage component is present in the outer layer in an amount in the range of 10 to 30% by weight.

22. The composite of claim 21, wherein
the inner layer comprises baria-alumina in an amount in the range of 50 to 97% by weight of the layer, palladium in an amount in the range of 1.5 to 5% by weight of the layer, and one or more binders, promoters, or stabilizers in an amount in the range of 10.0 to 30.0% by weight of the layer;
the middle layer comprises a ceria-zirconia composite in an amount in the range of 87 to 97% by weight of the layer, platinum in an amount in the range of 0.5 to 5% by weight of the layer, one or more binders, promoters, or stabilizers in an amount in the range of 2.0 to 7.0% by weight of the layer, wherein substantially all of the platinum is impregnated on the a ceria-zirconia composite; and
the outer layer comprises a ceria-zirconia composite in an amount in the range of 87 to 97% by weight of the layer, rhodium in an amount in the range of 0.5 to 2.5% by weight of the layer, one or more binders, promoters, or stabilizers an amount in the range of 2.0 to 6.0% by weight of the layer, wherein substantially all of the rhodium is impregnated on the ceria-zirconia composite.

23. A layered catalyst composite comprising: a catalytic material on a carrier, the catalytic material comprising an inner layer deposited on the carrier comprising a platinum component on an inner layer support comprising an oxygen storage component; a middle layer deposited on the inner layer comprising a rhodium component on both a middle layer support comprising an oxygen storage component and a middle layer high surface area refractory metal oxide support; and an outer layer deposited on the middle layer comprising a palladium component on both an outer layer support comprising an oxygen storage component and an outer layer high surface area refractory metal oxide support, wherein the catalytic material is effective to substantially simultaneously oxidize carbon monoxide and hydrocarbons and reduce nitrogen oxides.

24. The composite of claim 23, wherein the inner layer further comprises a rhodium component.

25. The composite of claim 23, wherein the middle layer high surface area refractory metal oxide support and the outer layer high surface area refractory metal oxide support each independently comprises an activated compound selected from the group consisting of alumina, silica, silica-alumina, alumino-silicates, alumina-zirconia, alumina-ceria-zirconia, lanthana-alumina, lanthana-zirconia-alumina, baria-alumina, baria lanthana-alumina, baria-lanthana-neodymia-alumina, alumina-chromia, and alumina-ceria.

26. The composite of claim 23, wherein the inner layer support comprising the oxygen storage component, the middle layer support comprising the oxygen storage component, and the outer layer support comprising the oxygen storage component are each independently a ceria-zirconia composite.

27. The composite of claim 23, wherein the oxygen storage component is present in the inner layer in an amount in the range of 15 to 45% by weight of the layer, the oxygen storage component is present in the middle layer in an amount in the range of 5 to 40% by weight of the layer and the oxygen storage component is present in the outer layer in an amount in the range of 1 to 25% by weight.

28. The composite of claim 23, wherein
the inner layer comprises stabilized alumina in an amount in the range of 20 to 40% by weight of the layer, a ceria-zirconia composite in an amount in the range of 55 to 75% by weight of the layer, platinum in an amount in the range of 0.1 to 2.5% by weight of the layer, and one or more binders, promoters, or stabilizers in an amount in the range of 5.0 to 7.0% by weight of the layer, wherein substantially all of the platinum is impregnated on the ceria-zirconia composite;
the middle layer comprises a ceria-zirconia composite in an amount in the range of 50 to 70% by weight of the layer, a stabilized alumina in an amount in the range of 20 to 40% by weight of the layer, rhodium in an amount in the range of 0.1 to 2.0% by weight of the layer, one or more binders, promoters, or stabilizers an amount in the range of 2.0 to 5.0% by weight of the layer, wherein an amount of at least 25% of the rhodium is impregnated on the stabilized alumina and the balance of the rhodium is impregnated on the ceria-zirconia composite; and
the outer layer comprises stabilized alumina in an amount in the range of 60 to 90% by weight of the layer, a ceria-zirconia composite in an amount in the range of 8 to 40% by weight of the layer, palladium in an amount in the range of 0.5 to 10% by weight of the layer, one or more binders, promoters, or stabilizers an amount in the range of 1.5 to 7.0% by weight of the layer, wherein an amount of at least half of the palladium is impregnated on the stabilized alumina and the balance of the palladium is impregnated on the ceria-zirconia composite.

29. A method for treating a gas comprising hydrocarbons, carbon monoxide, and nitrogen oxides comprising: contacting the gas with a catalytic material on a carrier, the catalytic material comprising three layers, wherein a first layer comprises a platinum component on a first support; a second layer comprises a rhodium on a second support; and a third layer comprises a palladium component on a third support; wherein the catalytic material is effective to substantially simultaneously oxidize the carbon monoxide and the hydrocarbons and reduce the nitrogen oxides.

30. The method of claim 29, wherein the gas is at a temperature of 1100° C. or less.

31. The method of claim 29, wherein the first support and the second support each independently comprises an oxygen storage component and the third support comprises a high surface area refractory metal oxide.

32. The method of claim 31, wherein the first support and the second support each independently further comprises a high surface area refractory metal oxide, and the third support further comprises an oxygen storage component.

* * * * *